(12) United States Patent
Schmidt et al.

(10) Patent No.: US 8,981,010 B2
(45) Date of Patent: Mar. 17, 2015

(54) POLYMER POWDER FOR PRODUCING THREE-DIMENSIONAL OBJECTS

(75) Inventors: Friedrich Georg Schmidt, Haltern am See (DE); Stefan Hilf, Rodenbach (DE); Jiawen Zhou, Moers (DE); Nathalie Guimard, Saarbruecken (DE); Christopher Barner-Kowollik, Stutensee (DE); Kim Klaus Oehlenschlaeger, Hockenheim (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 14/127,380

(22) PCT Filed: Jun. 5, 2012

(86) PCT No.: PCT/EP2012/060539
§ 371 (c)(1),
(2), (4) Date: Dec. 18, 2013

(87) PCT Pub. No.: WO2013/013873
PCT Pub. Date: Jan. 31, 2013

(65) Prior Publication Data
US 2014/0121327 A1 May 1, 2014

(30) Foreign Application Priority Data
Jul. 26, 2011 (DE) .......................... 10 2011 079 812

(51) Int. Cl.
C08F 20/26 (2006.01)
B29C 67/00 (2006.01)
C08F 2/60 (2006.01)
C08J 3/24 (2006.01)
C08J 3/28 (2006.01)
C08J 5/00 (2006.01)

(52) U.S. Cl.
CPC .............. *C08F 20/26* (2013.01); *B29C 67/0077* (2013.01); *C08F 2/60* (2013.01); *C08J 3/247* (2013.01); *C08J 3/28* (2013.01); *C08J 5/00* (2013.01)
USPC ........................................ 525/327.2; 264/497

(58) Field of Classification Search
CPC ............ C08F 20/26; C08F 2/60; B29C 67/00; B29C 67/0077; C08J 3/247; C08J 3/28; C08J 5/00
USPC ........................................ 525/327.2; 264/497
See application file for complete search history.

(56) References Cited

U.S. PATENT DOCUMENTS

| 5,648,450 | A | 7/1997 | Dickens, Jr. et al. |
| 6,136,948 | A | 10/2000 | Dickens, Jr. et al. |
| 6,933,361 | B2 * | 8/2005 | Wudl et al. ..................... 528/365 |
| 2012/0289657 | A1 | 11/2012 | Hilf et al. |
| 2012/0309895 | A1 | 12/2012 | Schmidt et al. |
| 2013/0172480 | A1 | 7/2013 | Schmidt et al. |
| 2013/0303678 | A1 | 11/2013 | Hilf et al. |
| 2014/0163165 | A1 | 6/2014 | Schmidt et al. |

FOREIGN PATENT DOCUMENTS

WO     WO 2011/101176 A1     8/2011

OTHER PUBLICATIONS

International Search Report and Written Opinion issued Sep. 28, 2012 in PCT/EP2012/060539.
U.S. Appl. No. 14/363,055, filed Jun. 5, 2014, Schmidt, et al.
U.S. Appl. No. 14/360,442, filed May 23, 2014, Schmidt, et al.

* cited by examiner

*Primary Examiner* — Michael M Bernshteyn
(74) *Attorney, Agent, or Firm* — Oblon, McClelland, Maier & Neustadt, L.L.P.

(57) ABSTRACT

The invention relates to the use of a powder made of a polymer, which of two or more components with functionalities suitable for Diels-Alder reactions, or of a powder mixture (dry blend) made of powders respectively of at least one of the reactive components, where these together enter into the Diels-Alder reaction with one another and are capable of a retro-Diels-Alder reaction, in a rapid-prototyping process.

The invention further relates to moldings produced with use of said polymer powder through a layer-by-layer shaping process in which regions of a powder layer are melted selectively. The molding here can be removed from the powder bed after cooling and hardening of the regions previously melted layer-by-layer.

16 Claims, No Drawings

POLYMER POWDER FOR PRODUCING THREE-DIMENSIONAL OBJECTS

FIELD OF THE INVENTION

The invention relates to the use of a powder made of a polymer composed of two or more components with functionalities suitable for Diels-Alder reactions, or of a powder mixture (dry blend) made of powders respectively of at least one of the reactive components, where these together enter into the Diels-Alder reaction with one another and are capable of a retro-Diels-Alder reaction, in a rapid-prototyping process.

The invention further relates to moldings produced with use of said polymer powder through a layer-by-layer shaping process in which regions of a powder layer are melted selectively. The molding here can be removed from the powder bed after cooling and hardening of the regions previously melted layer-by-layer.

PRIOR ART

The rapid provision of prototypes is a task frequently encountered in recent times. Rapid-prototyping processes are particularly suitable, where these are based on pulverulent materials and produce the desired structures layer-by-layer through selective melting and hardening. Supportive structures for overhangs and undercuts here can be omitted, since the powder bed surrounding the melted regions provides sufficient supportive effect. Subsequent operations for removing supports are also omitted. The processes are also suitable for short-run production. The selectivities of these layer-by-layer processes can by way of example be achieved by applying susceptors, absorbers, or inhibitors, or by use of masks, or by way of focused introduction of energy, for example through a laser beam, or by way of glass fibers. The energy is introduced by way of electromagnetic radiation.

A process which has particularly good suitability for the purposes of rapid-prototyping is selective laser sintering (SLS). In this process, plastics powders are briefly selectively irradiated by a laser beam in a chamber, and the powder particles encountered by the laser beam therefore melt. The molten particles coalesce and in turn rapidly solidify to give a solid mass. This process can produce three-dimensional products simply and rapidly through repeated irradiation of a succession of freshly applied layers.

The patents U.S. Pat. No. 6,136,948 and WO 96/06881 provide a detailed description of the laser-sintering (rapid-prototyping) process for producing moldings from pulverulent polymers. A wide variety of thermoplastic polymers and copolymers is claimed for this application, examples being polyacetate, polypropylene, polyethylene, ionomers, and polyamide.

Other processes that have good suitability are the SIB process as described in WO 01/38061, and a process as described in EP 1 015 214. Both processes use full-area infrared heating to melt the powder. The selectivity of melting is achieved in the former process by applying an inhibitors, and in the second process by use of a mask. DE 103 11 438 describes another process. In this, the energy required for fusion is introduced through a microwave generator, and the selectivity is achieved by applying a susceptor. Other suitable processes are those that use an absorber which is either present within the powder or applied by ink-jet processes as described by way of example in DE 10 2004 012 682.8.

The rapid-prototyping or rapid-manufacturing processes (RP or RM processes) mentioned can use pulverulent substrates, in particular thermoplastic polymers, preferably polyester, polyvinyl chloride, polyacetal, polypropylene, polyethylene, polystyrene, polycarbonate, poly(N-methylmethacrylimides) (PMMI), polymethyl methacrylate (PMMA), polyamide, or a mixture thereof.

DE 197 47 309 describes the use of a nylon-12 powder which has increased melting point and increased enthalpy of fusion and which is obtained through reprecipitation of a polyamide previously produced from laurolactam by ring-opening and subsequent polycondensation. This is a nylon-12.

DE 10 2004 010 160 A1 describes the use of polymer powder with copolymer in shaping processes. The materials here are thermoplastic random copolymers made of a very wide variety of monomer units, where the emphasis is placed on laurolactam-based systems. Examples of monomers are mentioned for copolyesters, but no details of specific compositions are provided. The MFR value of the copolymers is from 1 to 10 g/10 min.

In the processing of thermoplastic polymers it is disadvantageous that, in order to avoid what is known as curl, the temperature in the construction chamber has to be maintained with maximum uniformity at a level just below the melting point of the polymeric material. In the case of amorphous polymers this means a temperature just below the glass transition temperature, and in the case of semicrystalline polymers it means a temperature just below the crystallite melting point. Curl means a distortion of the previously melted region, causing at least some extent of protrusion out of the construction plane. There is thus the risk that when the next powder layer is applied, for example by use of a doctor or a roll, the protruding regions are displaced or even entirely broken away. A consequence of this for the process is that the temperature of the entire construction chamber has to be maintained at a relatively high level, and that the volume change brought about by cooling and by crystallization in the moldings produced by processes of this type is considerable. Finally, the cooling process requires an amount of time that is not negligible specifically for the "rapid" processes.

A disadvantage in particular of semicrystalline thermoplastics is that in many cases there is a volume change during cooling. Although it is possible to use a very complicated and precise temperature profile to achieve substantial regulation of the volume change in an individual layer, the volume change caused by crystallization of variously structured three-dimensional moldings is not uniform. By way of example, the formation of crystalline structures is dependent on the cooling rate of the molding; at locations of different thickness or at locations involving angles this rate is different from the rate at other locations in the molding.

A disadvantage in particular of amorphous thermoplastics is high viscosity, which permits coalescence only markedly above the melting point or above the glass transition temperature. Moldings produced by above processes with amorphous thermoplastics are therefore often relatively porous; the process merely forms sinter necks, and the individual powder particles can still be discerned within the molding. However, if energy supply is increased in order to reduce viscosity the additional problem of dimensional accuracy arises; by way of example, heat conducted from the regions to be melted into the surrounding regions leads to lack of sharpness in the shape of the molding.

In contrast to thermoplastics, polymer powders made of thermosets or of elastomers cannot be processed, and there are no known systems that crosslink during melting. Powder materials of that type would in particular have the disadvantage that the crosslinking would take place primarily within an individual particle and to a lesser extent between the particles. However, this would not only reduce the stability of the molding, but also exacerbate the grainy-surface tendency that is in any case already present in moldings produced by means of rapid-prototyping. The crosslinked material in a molding of that type would moreover not be recyclable.

The generic term "click chemistry" is used for block-copolymer-construction methods that for some years have been the subject of research, mainly in academia. Here, two different homopolymers with linkable terminal groups are combined with one another and linked by way of example by a Diels-Alder reaction or Diels-Alder-analogous reaction, or another cycloaddition reaction. This reaction is aimed at construction of thermally stable, linear polymer chains, where appropriate of high molecular weight. In this context, Inglis et al. (Macromolecules 2010, 43, pp. 33-36) described by way of example polymers with terminal cyclopentadienyl groups, these being obtainable from polymers produced by means of ATRP. Said cyclopentadiene groups can react very rapidly in hetero Diels-Alder reactions with polymers which bear electron-deficient dithioesters as terminal groups (Inglis et al. Angew. Chem. Int. Ed. 2009, 48, pp. 2411-2414).

Sinnwell et al. (Chem. Comm. 2008, 2052-2054) describe the use of monofunctional RAFT polymers for linking to monofunctional polymers which a dihydrothiopyran group by way of a hetero-Diels-Alder reaction. This method can realize AB-diblock copolymers. Inglis et al. (Angew. Chem. Int. Ed. 2009, 48, pp. 2411-14) and Inglis et al. (Macromol. Rapid Commun. 2009, 30, pp. 1792-98) describe rapid variants of this hetero-Diels-Alder linking for the synthesis of AB-block copolymers with a dithioester group present after RAFT polymerization and with a terminal dienyl group. Sinnwell et al. (J. Pol. Sci.: Part A: Pol. Chem. 2009, 47, pp. 2207-13) describe the analogous production of multiarm star polymers.

U.S. Pat. No. 6,933,361 describes a system for producing transparent moldings that can easily be repaired. This system is composed of two polyfunctional monomers which polymerize to give a high-density network by means of a Diels-Alder reaction. One of the functionalities here is maleimide and the other functionality is a furan. Heat-treatment of this high-density network serves for repair of the same. The crosslinking takes place at temperatures above 100° C. The partial reverse reaction takes place at still higher temperatures.

OBJECT

In the light of the prior art, it was an object of the present invention to provide, for the rapid-prototyping process, in particular for the laser-sintering process, a powder material which leads to moldings with very good, in particular smooth, surface.

The molding produced by means of rapid-prototyping is moreover to have adequate stability.

The molding is moreover to be recyclable with reclamation of the powder material. A particular aim was that the material can be reused, e.g. after grinding of the molding.

The use of the powder material for producing moldings by means of laser-sintering processes is moreover intended to exhibit low viscosity in the molten state.

Other objects not explicitly mentioned can be discerned from the description, the examples, and the claims of the present invention.

ACHIEVEMENT OF OBJECTS

The objects were achieved through provision, for rapid-prototyping processes, in particular for the selective laser-sintering process (SLS), of a novel powder material capable of a Diels-Alder reaction or hetero-Diels-Alder reaction, and also capable, after conduct of said reaction, of a retro-Diels-Alder reaction or retro-hetero-Diels-Alder reaction.

The process of the invention produces a molding composed of a crosslinked structure within said molding. The crosslinking here also proceeds beyond the original powder-grain boundaries.

The invention in particular provides a polymer powder composed of oligomers or, respectively, monomers reversibly linked to one another, where the linking or crosslinking of the resultant polymers is brought about by way of (hetero-)Diels-Alder reactions. If introduction of electromagnetic energy raises the temperature above the required limit for a retro-(hetero-)Diels-Alder reaction, the initially crosslinked powders are in turn dissociated to give the individual components, and become flowable, and form new crosslinking points on cooling. Good crosslinking is thus achieved, also extending beyond the previous powder-grain boundaries, and a desired molding is formed.

In detail, the objects were achieved by using a novel laser-sintering process. This process uses a crosslinked powder material. This powder material comprises a component A with at least two dienophilic double bonds and a component B with at least two diene functionalities capable of (hetero-) Diels-Alder reactions. At least one of these two components A or B here has more than two of the respective functionality. This powder material is crosslinked in a first step by means of a Diels-Alder reaction or of a hetero-Diels-Alder reaction at a temperature 1, which is preferably room temperature. In a second step, the crosslinked powder material is provided in the form of a powder bed and then, in a third step, the crosslinking of said powder material is selectively reversed to an extent of at least 50% at a temperature 2 that is higher than temperature 1. In particular, after the temperature has been introduced the powder material becomes flowable, preferably liquid.

In a fourth step, the powder material is in turn cooled after introduction of the temperature 2. Preference is given here to cooling to room temperature. The previously flowable powder material solidifies here to give a molding. In a fifth step, this molding is removed and cleaned. The cleaning can be achieved by means of compressed air or of water, or of a solvent.

In an alternate, preferred embodiment of the present invention, the molding can in turn be processed by grinding to give the powder material. The resultant reclaimed powder material can then be used in the process described above.

In step 3, there are various ways of introducing the temperature 2 selectively into the powder material provided. It is important here that the temperature increase can be applied to narrowly restricted regions of the powder material. In one embodiment, the temperature increase is achieved by means of electromagnetic radiation. In one particular embodiment, the energy from the temperature increase is introduced in the form of laser radiation.

In another variant of the process, the temperature of the powder bed is controlled during the process, in particular after the material has been provided in the form of powder bed and prior to step 3, to a temperature 3 which is between temperature 1 and temperature 2. This firstly ensures more rapid and more selective flowability in step 3. Secondly, moldings are obtained with a smoother surface structure of better optical quality. This temperature 3 is preferably from 5 to 20° C. below the temperature at which the powder material becomes flowable.

Temperature 3 can moreover also have a significance after the cooling from temperature 2. To the extent that the diene-dienophil pairing requires this, some heating of the powder bed after step 3 is necessary in order that, after melting, the Diels-Alder reaction can resume within an acceptable time, and in order that the crosslinking points again become linked: by way of example for the furan/bismaleimide reaction pairing the powder bed should be maintained at about 100° C. No elevated temperatures are necessary for the pyridyldithioester/cyclopentadiene reaction pairing.

The extent to which temperature 2 is above the temperature that provides flowability is preferably at least 5° C., preferably at least 10° C., and particularly preferably at least 25° C. The extent to which temperature 2 is below the decomposition temperature of the components of the powder material used is generally at least 5° C. Temperature 1 is a temperature at which the Diels-Alder reaction between components A and B takes place without any relevant extent of reverse reaction. Temperature 1 can be from 0 to 80° C., and it is preferable that temperature 1 is room temperature.

Factors that play a part in the liquefaction of, or achievement of flowability of, the powder material are not only the retro-(hetero-)Diels-Alder temperature but also, when polymers are used, the softening points of these, i.e. the melting points or glass transition temperatures of the polymers used. It is essential that the temperature 2 is above the softening point of at least one, preferably of at least two, most preferably of all, of the polymer components used.

The powder material of the invention is preferably produced by melting all of the components together, whereupon the (hetero-)Diels-Alder reaction takes place, and then cooling and grinding, spray-drying, or atomizing. The reaction mixture used in the atomizing process here is still warm, and cools during the atomizing process.

The powder material used in the invention is in principle composed of two components, which can respectively be one or more di- or polyfunctional oligomers or, respectively, monomers. The first component A has diene structures suitable for Diels-Alder reactions, and the second component B has corresponding dienophil structures.

Component A and component B differ by at most 40%, preferably by at most 20%, and particularly preferably by at most 10% in their functionality ratio in the powder material. It is very particularly preferable that the two components are present in a ratio of 1:1.

It is particularly preferable that at least one of the components A or B is a polymer. It is preferable that each of A and B is a polymer. In one alternative embodiment, an individual polymer has both functions. In this case, A and B are therefore the same polymeric compound. In another alternate, preferred embodiment the two different functions—diene and dienophil—are distributed between two components A and B that are separate from one another.

In the event that each of the two components A and B is a polymer, these polymers can be identical or different polymers. In the case of identical polymers, these can be distinguished only by the diene functionality and, respectively, dienophil functionality, and not through other aspects of the composition of the polymers. Molecular weights, polydispersities, and particle sizes here can certainly differ from one another. However, it is preferable that these differences are kept small.

The polymers that can be used, respectively functionalized as diene and/or as dienophil, can be polyacrylates, polymethacrylates, polystyrenes, copolymers of acrylates, of methacrylates, and/or of styrenes, polyacrylonitrile, polyethers, polyesters, polylactic acids, polyamides, polyestera- mides, polyurethanes, polycarbonates, amorphous or semicrystalline poly-a-olefins, EPDM, EPM, hydrogenated or non-hydrogenated polybutadienes, ABS, SBR, polysiloxanes, and/or block, comb, and/or star copolymers of these polymers.

A preferred feature of the process of the invention is that components A and B make up at least 50% by weight of the entire powder material, preferably at least 70% by weight.

In one very specific embodiment of the process of the invention, the powder material comprises at least 50% by weight of an inorganic component, in particular of a metal powder. In this embodiment, components A and B serve for the embedment of this metal powder within a coherent matrix, or for adhesive bonding of the metal powder. A particularly stable metallic-effect molding is thus obtained. This type of variant is of particular interest for prototype production.

In one particularly preferred embodiment of the invention, the powder material takes the form of a mixture of at least two different powders. At least one powder here is component A and at least one other powder here is component B. This type of system is also called a "dry blend". This type of dry blend can easily be obtained through mixing of the two components.

It is preferably that the functionality ratio of component A to component B in this type of dry blend is about 1:1. "About" means in this context that the difference in the molar amount of functionality between the minor component and the major component is at most 20%, preferably at most 10%, and particularly preferably at most 5%.

The difference between the softening points of the individual components in a dry blend is preferably not ore than 30° C., preferably not more than 20° C., and particularly preferably not more than 10° C. This ensures uniform and simultaneous melting.

Component A is a compound, preferably a polymer, with at least two dienophilic groups. Compound A generally takes the following form:

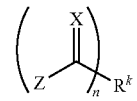

Z is an electron-withdrawing group. $R^k$ is a polyvalent organic group or a polymer, and n is a number from 2 to 20. X can be oxygen, sulfur, an NH moiety or a $CH_2$ moiety, preferably being sulfur or a $CH_2$ moiety. In the case of a $CH_2$ moiety, a "normal" Diels-Alder reaction is carried out. The only important factor in the selection of the group and of the associated diene is that the Diels-Alder reaction can be activated at a temperature below 80° C., and can in turn be reversed by means of a retro-Diels-Alder reaction at a higher reaction, and that this higher temperature is as far as possible below the decomposition temperature of the components present in the powder material.

In the event that Z is a sulfur atom, hetero-Diels-Alder reactions and retro-hetero-Diels-Alder reactions are accordingly carried out. The conditions applicable to these are the same as described above for the Diels-Alder components.

In this case therefore, where the dienophil is a compound with a carbon-sulfur double bond, component A has the following structure:

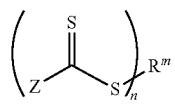

Z here is an electron-withdrawing group, $R^m$ is a polyvalent organic group or a polymer, and n is a number from 2 to 20. In this case it is particularly preferable that the dienophil is a dithioester or a trithiocarbonate.

In one preferred embodiment, the group Z is a 2-pyridyl group, a phosphoryl group, or a sulfonyl group. Other groups that can be used are cyano groups or trifluoromethyl groups, or else any other group Z which very greatly reduces the electron density in the C=S double bond and thus permits rapid Diels-Alder reaction.

A detailed description of the dienophil groups for this embodiment of a (retro-)hetero-Diels-Alder reaction is found in the German patent application 102010002987.9 (or the international patent application PCT/EP2011/050043). That document also provides inventive examples of the conduct of the reaction.

Component B is a diene. This diene has the general formula:

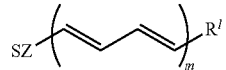

SZ here is a group that is likely to be electron-donating, although it can also simply be hydrogen or a simple alkyl moiety. $R^l$ is a polyvalent organic group or a polymer, and n is a number from 2 to 20. The carbon atoms of the double bonds can moreover bear other moieties.

Examples of known groups with particularly good suitability as diene are furfuryl moieties, adducts of sorbic alcohol, or cyclopentadienyl moieties.

If the powder material in the form of a powder mixture comprises a mixture of particles comprising diene functionality and particles comprising dienophil functionality, it is preferable that by way of example the median size of the particles comprising the diene functionality is from 10 to 250 μm, preferably from 40 to 100 μm, and particularly preferably from 45 to 80 μm. The extent to which the size of the particles comprising dienophil functionality is greater than or less than the median grain size $d_{50}$ of the particles or powders comprising diene functionality is then preferably not more than 20%, preferably not more than 15%, and very particularly preferably not more than 5%.

The relationships can also be reversed: the particles comprising dienophil functionality preferably have by way of example a median size of from 10 to 250 μm, preferably from 40 to 100 μm, and particularly preferably from 45 to 80 μm. The extent to which the size of the particles comprising diene functionality is greater than or less than the median grain size $d_{50}$ of the particles or powders comprising dienophil functionality is then preferably not more than 20%, preferably not more than 15%, and very particularly preferably not more than 5%. The grain size is in particular limited by the permissible overall height or layer thickness in the laser-sintering apparatus.

If the particles comprising the powder material are of a single type and these were initially produced from the low-molecular-weight or oligomeric/polymeric units comprising the diene functionality and from the low-molecular-weight or oligomeric/polymeric units comprising the dienophil functionality, the material may be sieved or sifted in such a way that the median grain size $d_{50}$ of the particles is preferably from 10 to 250 μm, preferably from 40 to 100 μm, and particularly preferably from 45 to 80 μm. Once the Diels-Alder reaction has taken place, particles of this single type can be attained by subjecting the product obtained directly at elevated temperature from the Diels-Alder reaction to atomization, with cooling, or to grinding or spray-drying.

The powder material of the invention can comprise flow aids or such other auxiliaries and/or fillers and/or pigments. These auxiliaries can by way of example be fumed silicone dioxide or else precipitated silicas. Fumed silicone dioxide (fumed silicas) is supplied by way of example as Aerosil® with various specifications by Evonik Degussa AG. It is preferable that powder material of the invention comprises less than 3% by weight, preferably from 0.001 to 2% by weight, and very particularly preferably from 0.05 to 1% by weight, of these auxiliaries, based on the entirety of the polymers present, i.e. on the entirety of the component comprising diene functionality and of the component comprising dienophil functionality. The fillers can by way of example be glass particles, aluminum particles, other metal particles, or ceramic particles, for example solid or hollow glass beads, steel shot, or metal granules, or else color pigments, e.g. transition metal oxides.

The median grain size of the filler particles here is preferably smaller than or approximately equal to that of the particles of the polymers, i.e. of the entirety of the component comprising diene functionality and of the component comprising dienophil functionality. The extent of which the median grain size $d_{50}$ of the fillers exceeds the median grain size $d_{50}$ of the polymer particles, i.e. particles of the component comprising diene functionality and of the component comprising dienophil functionality, is not more than 20%, preferably not more than 15%, and very particularly preferably not more than 5%. The same applies correspondingly to the particle size relationships when a dry blend made of the individual components is used. The particle size is in particular limited by the permissible overall height or layer thickness in the laser-sintering apparatus.

It is preferable that powder material of the invention or sinter powder of the invention comprises less than 70% by weight, with preference from 0.001 to 60% by weight, with particular preference from 0.05 to 50% by weight, and with very particular preference from 0.5 to 25% by weight, of fillers, based on the entirety of the polymers present, the resultant proportion by volume of the polymers always being greater than 50% by volume.

If the stated maximum limits for auxiliaries and/or fillers are exceeded, the result, depending on the filler or auxiliary used, can be significant adverse effects on the mechanical properties of moldings produced by means of these sinter powders. Another possible result of exceeding these limits is disruption of the intrinsic absorption of the laser light by the sinter powder to the extent that a powder of this type can no longer be used for selective laser sintering.

The present invention also provides a molding obtainable by the process, composed of a crosslinked material. This molding is characterized in that the molding has been formed by means of a laser-sintering process from a polymer powder, and that the powder material comprised, at the time of melting, a component A with at least two dienophilic double bonds and a component B with at least two diene functionalities, where at least one of these two components A or B has more than two of the respective functionalities mentioned.

The moldings can be subjected to further operations in further processing steps, for example can be colored or printed. They are used by way of example as prototypes, (architectural) models, tooling, promotional gifts, or preforms for producing casting molds, or in short-run production, e.g. for automobile construction or for demonstration purposes.

EXAMPLE

Precursor 1 a) 1 equivalent of 1,4-bis(bromoisobutyryloxy)butane, 0.35 equivalent of copper(I) oxide, and 0.75 equivalent of pentamethyldiethylenetriamine are added to an initial charge of 53 equivalents of monomer mixture composed of 49 parts by weight of methyl methacrylate, 86 parts by weight of n-butyl acrylate, and 15 parts by weight of furfuryl methacrylate in a 1 L three-necked flask with magnetic stirrer, nitrogen supply, and reflux condenser. An amount of acetate sufficient to give 500 mL of a 50% by volume solution is added to the mixture. Oxygen present is removed by passing nitrogen through the system for 40 minutes. The mixture is then heated under nitrogen to 60° C. in an oil bath. After 3 h of polymerization, this is terminated by cooling to room temperature and introducing atmospheric oxygen. The copper catalyst is removed by electrochemical deposition on zinc dust in accordance with the process described in WO 2012007213. The polymer bearing furfuryl groups is obtained by evaporation of the solvent. The molar mass is determined by means of GPC with calibration against PMMA standards in THF: $M_n$=11 000 g·mol$^{-1}$, PDI=1.5.

Example 1 m-Xylylenebismaleimide (1.0 equivalent in relation to furfuryl groups), 6 parts by weight of tetrahydrofuran and one part by weight of ZnCl$_2$ are admixed with 60 parts by weight of precursor 1 and stirred at 50° C. for 2 hours. The sample is then poured into an aluminum dish and dried (overnight) at 50° C. in a vacuum oven. The resultant solid is then browned to the desired grain size and optionally sieved.

This powder can be used according to the description in a laser-sintering 3D-printing machine.

What is claimed is:

1. A process for laser-sintering a crosslinked powder material, the process comprising:
   crosslinking a powder material by a Diels-Alder reaction or a hetero-Diels-Alder reaction at a temperature 1, said temperature 1 being from 0 to 80° C.;
   providing a crosslinked powder material in form of a powder bed; and
   selectively reversing the crosslinking of the powder material to an extent of at least 50% by heating the powder material at a temperature 2 said temperature 2 being higher than the temperature 1,
   wherein the powder material comprises a component A having at least two dienophilic double bonds and a component B at least two diene functionalities, and
   at least one of the components A and B has more than two of corresponding functionalities.

2. The process as claimed in claim 1, wherein the temperature 1 is room temperature, and the powder material is flowable after heating the powder material to temperature 2.

3. The process as claimed in claim 2, the process further comprising:
   after heating the powder material to temperature 2, cooling the powder material in turn, thereby solidifying the powder material to obtain a molding.

4. The process as claimed in claim 1, wherein at least one of the components A, B or both is a polymer.

5. The process as claimed in claim 4, wherein the component A and the component B are polymers where the polymers thereof are identical or different.

6. The process as claimed in claim 5, wherein the powder material is a mixture of at least two different powders, and at least one powder is the component A and at least one other powder is the component B.

7. The process as claimed in claim 4, of the components A, B, or both is at least one polymer selected from the group consisting of a polyacrylate, a polymethacrylate, a polystyrene, a copolymer of an acrylate, methacrylate, styrene, or any combination thereof, a polyacrylonitrile, a polyether, a polyester, a polylactic acid, a polyamide, a polyesteramide, a polyurethane, a polycarbonate, an amorphous or semicrystalline poly-α-olefin, an EPDM, an EPM, a hydrogenated or non-hydrogenated polybutadiene, an ABS, an SBR, a polysiloxane, and a block, comb, star, or any combination copolymer thereof.

8. The process as claimed in claim 1, wherein the components A and B make up at least 50% by weight of the powder material.

9. The process as claimed in claim 1, wherein the powder material comprises at least 50% by weight of an inorganic component.

10. The process as claimed in claim 1, wherein said heating the powder material at a temperature 2 is carried out with electromagnetic radiation.

11. The process as claimed in claim 10, wherein said electromagnetic radiation is in the form of laser radiation.

12. The process as claimed in claim 3, further comprising:
    processing the molding in turn via grinding to obtain the powder material, and
    optionally recycling the powder material in turn in the process for laser-sintering the crosslinked powder material.

13. The process as claimed in claim 1, further comprising:
    controlling a temperature of the powder bed during the process to a temperature 3 which is between the temperature 1 and the temperature 2.

14. The process as claimed in claim 1, wherein the component A is a compound with a carbon-sulfur double bond.

15. The process as claimed in claim 14, wherein the component A is a compound of formula:

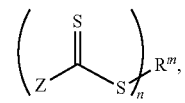

wherein Z is an electron-withdrawing group,
R$^m$ is a polyvalent organic group or a polymer, and
n is a number from 2 to 20.

16. A molding comprising a crosslinked material, wherein the molding is obtained by the process according to claim 1.

* * * * *